June 12, 1928.
G. B. DRYDEN ET AL
1,673,141
MOLDING OR TRIM AND METHOD OF ATTACHMENT
Filed May 21, 1924
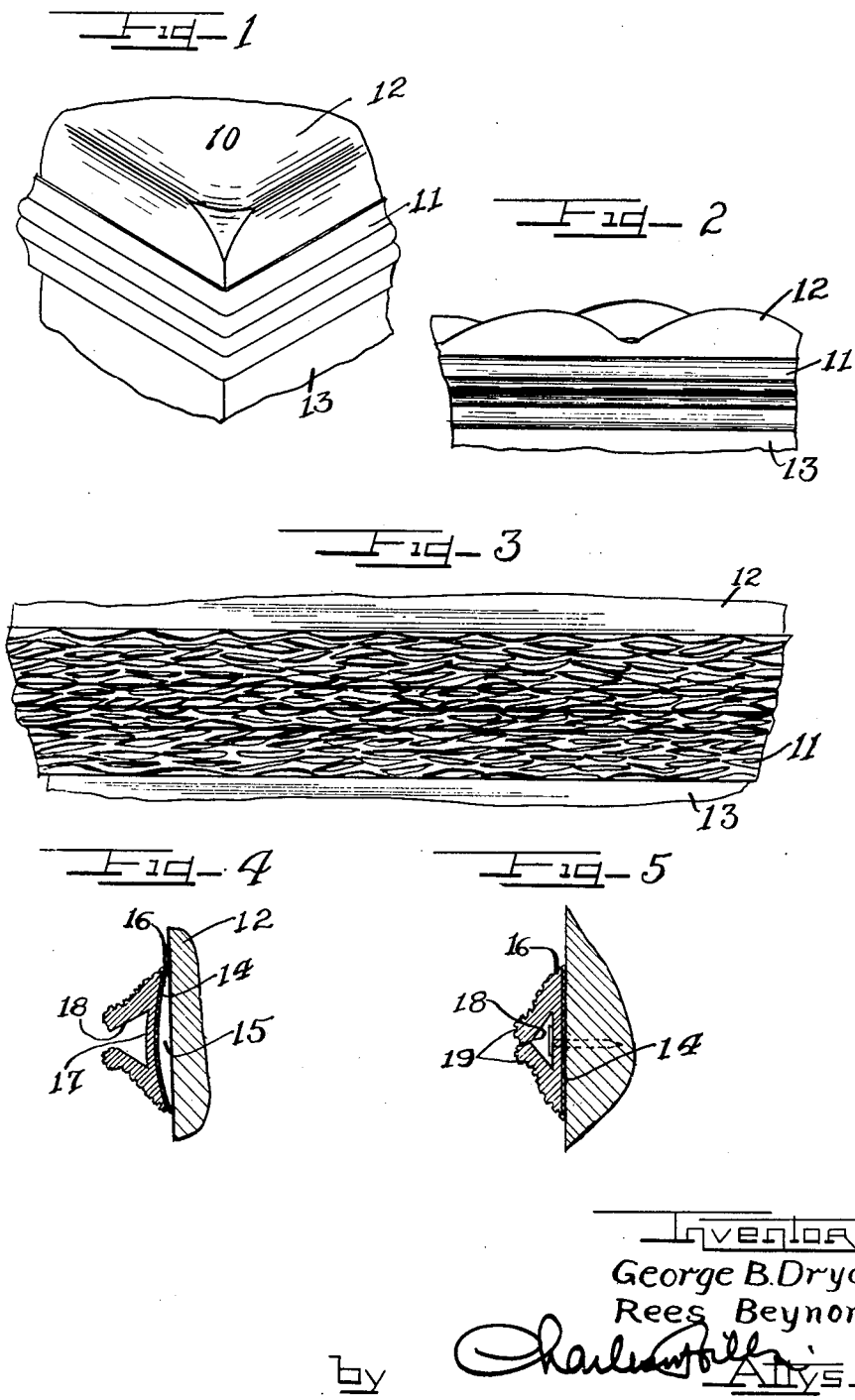
Inventors
George B. Dryden
Rees Beynon
by
Attys.

Patented June 12, 1928.

1,673,141

UNITED STATES PATENT OFFICE.

GEORGE B. DRYDEN AND REES BEYNON, OF CHICAGO, ILLINOIS, ASSIGNORS TO DRYDEN RUBBER COMPANY, A CORPORATION OF ILLINOIS.

MOLDING OR TRIM AND METHOD OF ATTACHMENT.

Application filed May 21, 1924. Serial No. 714,905.

This invention relates to a molding or trim for use in upholstery of vehicle bodies, furniture and similar objects and to the method of attachment thereof.

It is an object of this invention to provide an improved molding or trim having a central recess with overhanging edges or lips adapted to close together to conceal the heads of nails driven into the recess for retaining the molding in place.

It is also an object of this invention to provide an improved molding or trim having a canvas-reinforced arcuate back adapted to put the edges of the molding under compression by the flattening out of this arcuate section when the molding is nailed in place.

It is a further object of this invention to provide a flexible molding or trim having a longitudinal groove with upstanding edges adapted to be spaced apart until secured in place to permit ready insertion of the securing means in the groove.

It is also an object of this invention to provide a molding wherein the surface is grained in imitation of various styles of leather and fabric.

It is another object of this invention to provide a molding or trim having a central slot with upstanding edges formed to resemble beads whereby when the edges of the slot come together there will be produced, in effect, a double bead concealed the existence of the slot.

Other and further important objects of this invention will be apparent from the disclosures in the drawings and specification.

The invention (in a preferred form) is illustrated on the drawings and hereinafter more fully described.

On the drawings:

Figure 1 is a perspective view of the corner of an article showing the application of the molding of this invention.

Figure 2 is a side view of a portion of upholstery showing the use of this molding for covering the junction of the upholstering and the body of the article.

Figure 3 is an enlarged view of a fragment of molding in place.

Figure 4 is a section of such a molding as applied to a flat surface to illustrate the curvature thereof.

Figure 5 is a section of the finished molding when nailed in place.

As shown on the drawings:

The perspective view of an article 10 as shown in Figure 1 is provided with a strip of molding 11 concealing the junction between the top covering 12 and the sides 13 of the article. The drawing may be considered as a general representation of a piece of upholstered furniture or the trim around vehicle seat cushions.

The molding or trim 11 comprises a molded rubber strip of approximately semi-circular section, having a canvas backing or reinforcement 14 formed to give the back surface of the molding a slightly arcuate section as indicated by the numeral 15 in Figure 4. When such a molding section is nailed in place this arcuate section is distorted, placing the extreme edge 16 of the molding under compression and thereby assuring that the molding will not tend to curl under the nail pressure and present unsightly gaps along the edges.

A longituidnal slot or groove 17 is formed in the exposed surface of the molding and may be of triangular form as shown with the base of the triangle parallel to the base of the molding. Such a triangular shape is not essential, however, the essential feature being that the edges 18 of the slot shall converge until they nearly meet in the undistorted molding. The previously mentioned distortion of the molding when secured in place causes these edges 18 to close together with appreciable pressure, completely covering the slot.

The molding is preferably formed with a grained surface in imitation of leather, fabric and the like according to the use to be made of it, and the outstanding edges 18 bordering the slot are preferably formed with external beads 19 which form a double beaded effect on the finished molding that renders the meeting line of the slot inconspicuous.

We are aware that numerous details of construction may be varied through a wide range without departing from the principles of this invention, and we therefore do not purpose limiting the patent granted otherwise than necessitated by the prior art.

We claim as our invention:

1. A strip molding formed of resilient material with an arcuate back and a normally open groove in the face thereof, and having overhanging edges at the sides of the groove adapted to abut one another when the molding is distorted by driving nails therethrough in the said groove.

2. A rubber trim molding having a groove in the face thereof, a fabric back united to the molding and adapted to normally distort the molding into an arcuate cross section to cause the edges along opposite sides of the groove to gap open, whereby said edges may be forced together by driving fastening means through the molding within the groove and in this way flattening the back of the molding.

3. A strip molding formed of resilient material with an arcuate back and a normally open groove in the face thereof, having overhanging beads along the side edges of said groove adapted to abut one another when the molding is distorted by driving nails therethrough within the groove.

In testimony whereof we have hereunto subscribed our names.

GEORGE B. DRYDEN.
REES BEYNON.